(12) United States Patent
Hara

(10) Patent No.: US 8,841,359 B2
(45) Date of Patent: Sep. 23, 2014

(54) ELASTOMER COMPOSITION, METHOD FOR PRODUCING SAME AND PNEUMATIC TIRE USING SAME

(71) Applicant: The Yokohama Rubber Co., Ltd., Tokyo (JP)

(72) Inventor: Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/094,096

(22) Filed: Dec. 2, 2013

(65) Prior Publication Data

US 2014/0088231 A1    Mar. 27, 2014

Related U.S. Application Data

(62) Division of application No. 12/281,348, filed as application No. PCT/JP2007/054618 on Mar. 2, 2007.

(30) Foreign Application Priority Data

Mar. 3, 2006    (JP) ................................ 2006-058273

(51) Int. Cl.
*C08K 5/43*    (2006.01)
(52) U.S. Cl.
USPC ....................................................... 523/336
(58) Field of Classification Search
USPC ....................................................... 523/336
See application file for complete search history.

(56) References Cited

U.S. PATENT DOCUMENTS

| 5,919,864 | A | 7/1999 | Watanabe et al. |
| 6,062,283 | A | 5/2000 | Watanabe et al. |

FOREIGN PATENT DOCUMENTS

| JP | 51-25228 | 5/1993 |
| JP | 9-100413 | 4/1997 |
| JP | 9-316344 | 12/1997 |
| JP | 10-114840 A | 5/1998 |
| JP | 10-245452 | 9/1998 |
| JP | 11-228706 | 8/1999 |
| JP | 2000-159936 | 1/2000 |
| JP | 2002-80644 | 3/2002 |
| JP | 2003-26931 | 1/2003 |

OTHER PUBLICATIONS

Paul et al., "Polymer Blends (Or Alloys)", Journal of Macromolecular Science—Reviews in Macromolecular Chemistry, vol. C18, No. 1, 1980, pp. 143-147.
Machine translation of JP 05-125228 May 1993.
Machine translation of JP 10-245452 Sep. 1998.
Okamoto et al., "Phase Inversion and Structure Formation in Dynamic Vulcanization Process of Polymer Blend", Kobunshi Ronbunshu, vol. 48, No. 10, pp. 657-662 (Oct. 1991).

*Primary Examiner* — John Uselding
(74) *Attorney, Agent, or Firm* — Novak Druce Connolly Bove + Quigg LLP

(57) ABSTRACT

An elastomer composition, having an excellent flexibility and low temperature durability, a method for producing the same and a pneumatic tire using the same are provided. An elastomer composition (C) comprising a matrix of a thermoplastic resin (A), in which a dispersed phase of an elastomer component (B) is finely dispersed to form an island-in-sea structure, wherein volume ratios of the thermoplastic resin (A) and the elastomer component (B) satisfy the following formula (I):

$$\phi d/\phi m > \eta d/\eta m \qquad (I)$$

wherein $\phi d$ and $\eta d$, respectively, indicate a volume ratio and a melt viscosity of the elastomer component (B), and $\phi m$ and $\eta m$, respectively, indicate a volume ratio and a melt viscosity of the thermoplastic resin (A)), a method for producing the same and a pneumatic tire using the same.

4 Claims, No Drawings

US 8,841,359 B2

ELASTOMER COMPOSITION, METHOD FOR PRODUCING SAME AND PNEUMATIC TIRE USING SAME

CROSS REFERENCE TO RELATED APPLICATIONS

This application is a Divisional of co-pending U.S. application Ser. No. 12/281,348, filed on Sep. 2, 2008; which is a National Phase of PCT/JP2007/054618 filed on Mar. 2, 2007; and claims priority to Application No. 2006-058273 filed in Japan on Mar. 3, 2006; the entire contents of each of these applications is hereby incorporated by reference.

TECHNICAL FIELD

The present invention relates to an elastomer composition, a method for producing the same and a pneumatic tire using the same. More specifically, it relates to an elastomer composition having an excellent flexibility and low temperature durability, while maintaining the characteristics of the resin, a method for producing the same and a pneumatic tire using the same.

BACKGROUND ART

A thermoplastic elastomer composition comprising a matrix (i.e., a continuous phase) of a thermoplastic resin, in which a rubber is finely dispersed (i.e., a dispersed phase) is known. It is known in the art that an island-in-sea structure, in which the rubber is surrounded with the resin, is formed under the conditions satisfying the formula (IV) explained later (e.g., see Japanese Patent Publication (A) No. 2000-159936). To obtain a rubbery elastomer from a composition obtained in a state where a thermoplastic resin forms a matrix, it is necessary to increase the amount of rubber as much as possible. However, when a large amount of rubber is compounded, the thermoplastic resin serving as the continuous phase and the elastomer component serving as the dispersed phase invert in phase, and, therefore, the thermoplastic elastomer composition thus prepared does not exhibit the fluidity of the thermoplastic resin and the shaping becomes impossible. Therefore, there have been limits to the amount of rubber which could be compounded.

DISCLOSURE OF THE INVENTION

Accordingly, an object of the present invention is to provide an elastomer composition (C) having a flexible and low temperature durability comprising a matrix of a relatively small amount of a thermoplastic resin (A), in which a relatively large amount of an elastomer component (B) is finely dispersed, a method for producing the same and a pneumatic tire using the same.

In accordance with the present invention, there are provided an elastomer composition (C) comprising a matrix of a thermoplastic resin (A), in which a dispersed phase of an elastomer component (B) is finely dispersed to form an island-in-sea structure, wherein volume ratios of the thermoplastic resin (A) and the elastomer component (B) satisfy the following formula (I):

$$\phi d/\phi m > \eta d/\eta m \qquad (I)$$

wherein $\phi d$ and $\eta d$, respectively, indicate a volume ratio and a melt viscosity of the elastomer component (B), and $\phi m$ and $\eta m$, respectively, indicate a volume ratio and a melt viscosity of the thermoplastic resin (A)) and a pneumatic tire using the same.

In accordance with the present invention, there is further provided a method for producing the above-mentioned elastomer composition (C) comprising the steps of: mixing and shaping a thermoplastic resin (A), an elastomer component (B) and a plasticizer (D) in a ratio satisfying the following formulae (II) and (III):

$$\phi d/(\phi m+\phi 1)\times(\eta ml/\eta d)<1 \qquad (II)$$

$$\eta ml/\eta d=0.8\text{-}1.2 \qquad (III)$$

wherein $\phi d$ and $\eta d$, respectively, indicate a volume ratio and a viscosity of the elastomer component (B), $\phi m$ indicates a volume ratio of the thermoplastic resin (A), $\phi 1$ indicates a volume ratio of the plasticizer (D), and $\eta ml$ indicates a melt viscosity of a mixture of the thermoplastic resin (A) and the plasticizer (D); and, then, removing the plasticizer (D) by evaporation, extraction or migration.

According to the present invention, it is possible to obtain a flexible elastic body, while maintaining the properties of the thermoplastic resin, for example, it is possible to prepare an inner liner having a combination of heat resistance, low gas permeability, chemical resistance and high dynamic durability when using Nylon, as the thermoplastic resin, and using a butyl-based rubber as the elastomer. Due to similar characteristics, it is also possible to use the elastic body for hose inner liners, packing, etc.

BEST MODE FOR CARRYING OUT THE INVENTION

The inventors engaged in research to solve the above problems and, as a result, found that, by mixing and shaping a thermoplastic resin (A), an elastomer component (B) and a plasticizer (D) in a composition satisfying the above formula (II) to obtain an island-in-sea structure, where the resin (A) forms the sea and the elastomer (B) forms the islands. After the final shape is formed, a part of the composition is removed, it becomes possible to obtain an island-in-sea structure having a highly increased ratio of the elastomer more than the limit ordinarily obtainable, whereby a flexible elastic body due to the high amount of elastomer, while maintaining the characteristics of the matrix thermoplastic resin (A).

To produce a conventionally known thermoplastic elastomer composition comprised of a matrix of a thermoplastic resin component, in which an elastomer component is dispersed (see Japanese Patent Publication (A) No. 9-100413, Japanese Patent Publication (A) No. 2000-159936, etc.), the following conditions are necessary. That is, when a volume ratio of the thermoplastic resin component forming the matrix (i.e., continuous phase) is $\phi m$, a viscosity at the time of melt mixing is $\eta m$, a volume ratio of the elastomer component forming the dispersed phase is $\phi d$, a viscosity under the same conditions is $\eta d$, it is necessary to mix the two components so that the value of $$\alpha=(\phi d/\phi m)\times(\eta m/\eta d)$$

becomes smaller than 1. That is, $$(\phi d/\phi m)\times(\eta m/\eta d)<1 \qquad (IV)$$

This is because, when the microstructure of the thermoplastic elastomer composition thus produced has the α value of smaller than 1, the thermoplastic resin component becomes the continuous phase (i.e., matrix) and the elastomer component becomes the dispersed phase (i.e., domain), and, therefore, molding becomes possible by the molding method of thermoplastic resins, but when α is 1 or more, the continuous phase and the dispersed phase are inverted, and, therefore, the thermoplastic elastomer composition thus prepared does not exhibit the fluidity of a thermoplastic resin and, therefore, molding by a molding machine for resin becomes possible. Further, when a larger amount of elastomer, if more than a certain amount is compounded, the α tends to become larger than 1 and the continuous phase and the dispersed phase become inverted. There were inherent limits in the conventional known production methods for further increasing the elastomer ratio, while maintaining the relationship between the continuous phase comprised of the thermoplastic resin and the dispersed phase comprised of the elastomer.

The present invention provides an elastomer composition, where it is maintained in such a state that a thermoplastic resin component (A) is a continuous phase (i.e., matrix) and an elastomer component (B) is a dispersed phase (i.e., domain), the volume ratio of the elastomer component (B) in the resin is increased to an extent which could not be realized in a conventional production method and a method for producing the same.

That is, while the elastomer composition (C) satisfies $$(\phi d/\phi m) \times (\eta m/\eta d) > 1 \quad (I)$$

a state of a continuous phase (i.e., matrix) of a thermoplastic resin component (A), in which an elastomer component (B) is present as a dispersed phase (i.e., domain), is formed.

Furthermore, the method for producing the elastomer composition (C) is as follows:

The plasticizer (D) is compounded into the thermoplastic resin component (A) as a pseudo resin component, together with the elastomer component (B), so as to satisfy the following conditions:

$$(\phi d/(\phi m+\phi l)) \times (\eta ml/\eta d) < 1 \quad (II)$$

$$\eta ml/\eta d = 0.8\text{-}1.2 \quad (III)$$

wherein φd and ηd, respectively, indicate a volume ratio and a viscosity of the elastomer component (B), φm indicates a volume ratio of the thermoplastic resin (A), φl indicates a volume ratio of the plasticizer (D), and ηml indicates a melt viscosity of a mixture of the thermoplastic resin (A) and the plasticizer (D)).

Due to the above compounding, a thermoplastic elastomer composition (E) comprising a thermoplastic resin component (A) including a plasticizer (D) forming a continuous phase (i.e., matrix) and an elastomer component (B) forming a dispersed phase (i.e., domain) is first produced. Here, the formula (III) shows that, when the viscosity ratio ηml/ηd is made within a range of 0.8 to 1.2, it is possible to make the dispersed particles of the elastomer smaller. It is known in the art that, when the dispersed particles is made smaller, the durability is improved (See Japanese Patent Publication (A) No. 2000-159936).

Here, φl/(φm+φl) is 0.05 to 0.6, more preferably 0.1 to 0.3.

Although the composition (E) thus produced is still of thermoplasticity, the elastomer composition (C) is produced by evaporating, extracting or migrating the plasticizer (D) from the composition (E). Note that this elastomer composition (C) loses its thermoplasticity.

As the thermoplastic resin (A) usable for preparation of the elastomer composition (C) of the present invention, one or more types of thermoplastic resins may be used. As the resin component, polyamide-based resins (e.g., Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6 (MXD6), Nylon 6T, Nylon 6/6T copolymer, Nylon 66/PP copolymer, and Nylon 66/PPS copolymer), a polyester-based resin (e.g., aromatic polyesters such as polybutylene terephthalate (PBT), polyethylene terephthalate (PET), polyethylene isophthalate (PEI), PET/PEI copolymer, polyarylate (PAR), polybutylene naphthalate (PBN), liquid crystal polyester, polyoxyalkylene diimidic acid/polybutylene terephthalate copolymer), polynitrile-based resins (e.g., polyacrylonitrile (PAN), polymethacrylonitrile, acrylonitrile/styrene copolymer (AS), methacrylonitrile/styrene copolymer, methacrylonitrile/styrene/butadiene copolymer), a polymethacrylate-based resins (e.g., polymethyl methacrylate (PMMA) and polyethyl methacrylate), polyvinyl-based resins (e.g., vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methyl acrylate copolymer), cellulose-based resins (e.g., cellulose acetate and cellulose acetobutyrate), fluorine-based resins (e.g., polyvinylidene fluoride (PVDF), polyvinyl fluoride (PVF), polychlorofluoroethylene (PCTFE) and tetrafluoroethylene/ethylene copolymer (ETFE)), imide-based resins (e.g., aromatic polyimide (PI)), etc. may be mentioned. Among these, linear polyamide resins such as Nylon are preferably used from the viewpoint of obtaining a balance of the durability and the gas barrier property.

Further, to the thermoplastic resin (A) forming the matrix of the elastomer composition, fillers, reinforcing agents, processing aids, stabilizers, antioxidants, etc. generally used for improving the workability, dispersability, heat resistance, antioxidation ability, etc. may be compounded, if necessary.

The elastomer component (B) usable for the preparation of the elastomer composition according to the present invention may be an elastomer composition comprising an elastomer component, in which the usual rubber compounding agents including the vulcanization compounding components have been compounded. Alternatively, it may be an elastomer composition comprising the elastomer component, in which the usual rubber compounding agents other than the vulcanization compounding components have been compounded. As such an elastomer component, natural rubber, synthetic polyisoprene rubber (IR), epoxylated natural rubber, styrene-butadiene rubber (SBR), polybutadiene rubber (BR), nitrile-butadiene rubber (NBR), hydrogenated NBR, hydrogenated SBR, or other such diene-based rubbers and their hydrogenated compounds; ethylene propylene rubber (EPDM, EPM), maleic acid-modified ethylene-α-olefin copolymer (M-PO), butyl rubber (IIR), isobutylene and aromatic vinyl or diene-based monomer copolymer, acryl rubber (ACM), ionomer, or other such olefin-based rubbers; Br-IIR, Cl-IIR, a bromide of isobutylene paramethylstyrene copolymer (Br-IPMS), chloroprene rubber (CR), hydrin rubber (CHC, CHR), chlorosulfonated polyethylene (CSM), chlorinated polyethylene (CM), maleic acid-modified chlorinated polyethylene (M-CM), or other such halogen-containing rubbers; methylvinyl silicone rubber, dimethyl silicone rubber, methylphenylvinyl silicone rubber, or other such silicone rubbers; polysulfide rubber or other such sulfur-containing rubbers; vinylidene fluoride-based rubbers, fluorine-containing vinyl ether-based rubber, tetrafluoroethylene-propylene-based rubber, fluorine-containing silicone-based rubber, fluorine-containing phosphagen-based rubber or other such fluororubbers; a styrene-based elastomer, olefin-based elastomer, polyester-based elastomer, urethane-based elastomer, polyamide-based elastomer, or other such thermoplastic elastomer, etc. may be mentioned.

The elastomer component (B) forming the dispersed phase of the elastomer composition (C) according to the present invention may also be dynamically vulcanized. The vulcanization agent, vulcanization aid and vulcanization conditions (e.g., temperature and time) etc. in the case of dynamic vulcanization may be appropriately determined depending upon the composition of the elastomer component (B) added and is not particularly limited. As the vulcanization agent, general rubber vulcanization agents (e.g., cross-linking agents) may be used. Specifically, as sulfur-based vulcanization agents, powdered sulfurs, precipitated sulfurs, dispersible sulfurs, surface treated sulfurs, insoluble sulfurs, dimorpholine disulfides, alkylphenol sulfides, etc. may be mentioned. For example, about 0.5 to 4 parts by weight (parts by weight per 100 parts by weight of elastomer component (or polymer)) or so may be used.

Further, as an organic peroxide system vulcanization agent, benzoyl peroxide, t-butylhydroperoxide, 2,4-dichlorobenzoyl peroxide, 2,5-dimethyl-2,5-di(t-butylperoxy)hexane, 2,5-dimethylhexane-2,5-di(peroxylbenzoate), etc. may be mentioned. For example, about 1 to 20 parts by weight may be used. Furthermore, as the phenol resin-based vulcanization agent, a mixed cross-linking system containing a bromide of an alkylphenol resin, stannous chloride, chloroprene, or another halogen donor and an alkylphenol resin etc. may be illustrated. For example, about 1 to 20 parts by weight may be used.

As other compounding components, zinc white (about 5 parts by weight), magnesium oxide (about 4 parts by weight), litharge (about 10 to 20 parts by weight), p-quinone dioxime, p-dibenzoylquinine oxime, tetrachloro-p-benzoquinone, poly-p-dinitrosobenzene (about 2 to 10 parts by weight), and methylene dianiline (about 0.2 to 10 parts by weight) may be illustrated.

Further, if necessary, a vulcanization accelerator may also be added. As the vulcanization accelerator, an aldehyde-ammonia-based, guanidine-based, thiazole-based, sulfonamide-based, thiuram-based, dithio acid salt-based, thiourea-based, or other general vulcanization accelerators may be used in an amount of, for example, about 0.5 to 2 parts by weight. Further, as the vulcanization acceleration aid, a general aid for rubber may be used together. For example, stearic acid, oleic acid, and their Zn salts (about 2 to 4 parts by weight) etc. may be used.

Furthermore, the elastomer component (B) forming the dispersed phase may have suitably compounded, in addition to the above compounding agents, a softening agent, antioxidant, processing aid, etc. generally compounded for improving the dispersability, heat resistance, etc. if necessary.

As the plasticizer (D) usable in the method of production of the present invention, alkylbenzene sulfonamide, diallyl phthalate, dioctyl phthalate, dioctyl sebacate, dioctyl adipate, diisodecyl phthalate, butylbenzyl phthalate, tricresyl phosphate, trimellitic acid isononyl ester and other esters, methanol, ethanol, 2-propanol, and other alcohols, paraffin oil, naphthene oil, aromatic oil, and other petroleum-based oils etc. may be used, but from the viewpoints of a high boiling point and solubility with resins, alkylbenzene sulfonamide is preferable.

In the present invention, the method for producing of an elastomer composition (C) comprising a matrix resin (A), in which an elastomer (B) is finely dispersed, may, for example, be as follows: First, the elastomer and, if necessary, the compounding agents are compounded, in advance, using a general kneader, Banbury mixer, etc. until obtaining a homogeneous mixed state to prepare an elastomer component (B). At this time, the elastomer component (B) may have suitable amounts of carbon black, oil, or calcium carbonate or another filler added thereto. Further, in the necessary case, a vulcanization agent or cross-linking agent of the elastomer, a vulcanization aid, vulcanization accelerator, etc. may also be added. Next, the thermoplastic resin (A) forming the matrix, the plasticizer (D), and the antioxidant or other compounding agents compounded, if necessary, are charged into a twin-screw kneader etc. and kneaded to prepare a thermoplastic resin component (A) forming the matrix. The resin component (A) thus prepared and the elastomer component (B) are charged into a twin-screw extruder etc. for melt mixing. When using an elastomer component (B) not containing any vulcanization compounding agents for the elastomer component (B), the vulcanization compounding agents may be added at the stage where sufficient mixing has been performed and further mixed to dynamically cross-link the elastomer component and obtain a thermoplastic elastomer composition (E).

Further, the various compounding agents may be added to the thermoplastic resin component (A) or elastomer component (B) by mixing, in advance, before the above twin-screw kneading, but may also be added during the above twin-screw kneading. Furthermore, the matrix resin, elastomer, various compounding agents and the plasticizer may be kneaded by a twin-screw kneader etc. all at once, but in that case, it is necessary to sufficiently knead the matrix resin and the plasticizer, then add the elastomer. The kneading of these elastomer component (B) and the matrix resin component (A) and the melt kneading of the elastomer composition should be conducted under the condition of a temperature, at which a thermoplastic resin melts, or more. Further, the shear rate at the time of kneading is preferably 500 to 7500 $sec^{-1}$, while the kneading time is preferably about 30 seconds to 10 minutes.

The thermoplastic elastomer composition (E) thus obtained is then formed into a sheet, film or tube, using a T-type sheeting die, a straight or crosshead structure tubing die, a cylindrical die for inflation molding, etc. at the front end of a single-screw extruder, then a part or all of the plasticizer (D) is removed by evaporation with oven heating, by migration with laminating with rubber, etc, followed by heat pressing, or by extraction using a solvent such as methanol, etc. to thereby obtain the shaped articles of the elastomer composition (C). For the utilization, as a low permeability layer for a pneumatic tire, hose, etc., the above thermoplastic elastomer composition (E) containing a plasticizer is adhered in a laminated state with rubber to, for example, the innermost layer of a tire or hose, the resultant assembly is formed into the final shape, then heat pressing is used to move the plasticizer (D) into the rubber so as to obtain a low permeability layer formed from the elastomer composition (C). This layer is composed of a resin as a matrix and rubber as a dispersed phase, with an extremely large amount of rubber and, therefor, becomes a flexible layer having a superior dynamic endurance like rubber, while maintaining the characteristics of the resin, for example, the low permeability, heat resistance and chemical resistance.

EXAMPLES

Examples will now be used to further illustrate the present invention, but the present invention is by no means limited in scope by these Examples.

Examples 1 to 7 and Comparative Examples 1 to 7

Preparation of Samples

In each formulation shown in Table I, the elastomer and cross-linking agent were mixed in an internal-type Banbury mixer (made by Kobe Steel Corporation) at 100° C. for 2 minutes to prepare a compound, which was then pelletized by a rubber pelletizer (made by Moriyama Manufacturing Co., Ltd.). Into the resin pellets, a plasticizer for resin (i.e. butyl benzene sulfonamide BM-4 made by Daihachi Chemical Industry Co., Ltd.) was added to about 30% by weight, based upon the weight of the resin ($\phi 1/(\phi m+\phi 1)=0.26$) and kneaded by a twin-screw type kneader (made by Japan Steel Works), then the plasticizer-containing resin thus obtained and the rubber pellets were kneaded again by a twin-screw type kneader (made by Japan Steel Works) to prepare pellets of a plasticizer-containing elastomer composition, which was dynamically vulcanized. The pellets thus prepared were formed into a sheet by a T-die molding machine, the plasticizer was removed by extraction using methanol, then the sheet was dried in a vacuum oven at 70° C. for 12 hours to completely remove the methanol, whereby a sheet of the elastomer composition was obtained.

Example 8

In the formulation shown in Table I, the elastomer and the cross-linking agent were mixed in an internal-type Banbury mixer (made by Kobe Steel Corporation) at 100° C. for 2 minutes to prepare an elastomer composition, which was then pelletized by a rubber pelletizer (Moriyama Manufacturing Co., Ltd.). Into the resin pellets, a plasticizer for resin (butyl benzene sulfonamide BM-4 made by Daihachi Chemical Industry Co., Ltd.) was added to about 30% by weight, based upon the weight of the resin and kneaded by a twin-screw kneader (made by Japan Steel Works), then the plasticizer-containing resin obtained and the elastomer pellets were kneaded again by a twin-screw-type kneader (made by Japan Steel Works) to prepare pellets of a plasticizer-containing elastomer composition, which was (dynamically vulcanized. The pellets prepared were formed into a sheet by a T-die molding machine, which was then dried in a vacuum oven at 180° C. for 30 hours to evaporate off the plasticizer, whereby a sheet of the elastomer composition was obtained.

Example 9

In the formulation shown in Table I, the elastomer and the cross-linking agent were mixed in an internal-type Banbury mixer (made by Kobe Steel Corporation) at 100° C. for 2 minutes to prepare an elastomer composition, which was the pelletized by a rubber pelletizer (Moriyama Manufacturing Co., Ltd.). Into the resin pellets, a plasticizer for resin (butyl benzene sulfonamide BM-4 made by Daihachi Chemical Industry Co., Ltd.) was added to about 30% by weight, based upon the weight of the resin and kneaded by a twin-screw kneader (made by Japan Steel Works), then the plasticizer-containing resin obtained and the elastomer pellets were kneaded again by a twin-screw kneader (made by Japan Steel Works) to prepare pellets of a plasticizer-containing elastomer composition, which was dynamically vulcanized. The pellets prepared were formed into a sheet by a T-die molding machine, which was then sandwiched between 2 mm sheets of a rubber compound having the following composition and then heat pressed at 180° C. for 15 minutes to evaporate the plasticizer, whereby the plasticizer is migrated to the rubber compound to thereby obtain a sheet of the elastomer composition.

Composition of Rubber Compound

| Component | Parts by weight | Manufacturer/Grade |
|---|---|---|
| Natural rubber | 80 | RSS#1 |
| SBR1502 | 20 | Nippon Zeon/Nipole 1502 |
| FEF carbon black | 50 | Chubu Carbon/HTC100 |
| Stearic acid | 2 | Kao/Lunac YA |
| Zinc oxide | 3 | Seido Chemical Industrial/Zinc White No. 3 |
| Sulfur | 3 | Karuizawa Refinery/Powdered Sulfur |
| Vulcanization accelerator | 1 | Ouchi Shinko Chemical Industries noccelar NS-P |
| Aromatic oil | 2 | Nippon Petrolecim/Coumorex 300 |

The sheets obtained were determined for physical properties by the following test methods. The results are shown in Table I.

Test Methods for Evaluation of Physical Properties

Air permeability: According to JIS K 7126 "Test Method for Gas Permeability of Plastic Film and Sheet (Method A)"

Test piece: A film sample prepared in each Example was used

Test gas: air ($N_2:O_2=8:2$)

Test temperature: 30° C.

To maintain the air pressure, $20 \times 10^{-12}$ (cm$^3$·cm/cm$^2$·sec·cmHg) or less is good, while $15 \times 10^{-12}$ (cm$^3$·cm/cm$^2$·sec·cmHg) or less is preferable.

M50 (−20° C.): Determined according to JIS K6251 at −20° C.

Dynamic Fatigue (−20° C.)

Constant strain test at −20° C.: A JIS No. 3 dumbbell was used to apply repeated strain of 40% by a constant strain tester (made by Ueshima Seisakusho Works) at −20° C. or less. Samples with points of 70% breakage rates by a Weibull plot exceeding 1 million cycles were judged as passing.

TABLE I

| Formulation (parts by weight) | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Elastomer | IPMS*[1] | 100 | 100 | 100 | 90 | 80 | 70 | — | 70 | 80 |
| | Mah-EPM*[2] | — | — | — | 10 | — | — | 40 | — | 10 |
| | Br-IIR*[3] | — | — | — | — | 20 | — | — | — | — |
| | IIR*[4] | — | — | — | — | — | 30 | — | — | 10 |
| | PIB*[5] | — | — | — | — | — | — | 60 | 30 | — |
| Cross-linking agent | ZnO*[6] | 1.0 | 1.0 | 1.0 | 1.0 | 1.0 | 1.0 | 1.0 | 1.0 | 1.0 |
| | Stearic acid*[7] | 0.5 | 0.5 | 0.5 | 0.5 | 0.5 | 0.5 | 0.5 | 0.5 | 0.5 |
| Thermoplastic resin | Nylon 6.66*[8] | 56 | — | — | 60 | 67 | 67 | 60 | 56 | 42 |
| | Nylon 6*[9] | — | 53 | — | — | — | — | — | — | — |
| | Nylon 11*[10] | — | — | 53 | — | — | — | — | — | 25 |
| (Total) | | (157.5) | (154.5) | (154.5) | (161.5) | (168.5) | (168.5) | (161.5) | (157.5) | (168.5) |

TABLE I-continued

| | | | | | | | | | |
|---|---|---|---|---|---|---|---|---|---|
| ($\phi d/(\phi m + \phi l)$) × ($\eta ml/\eta d$) | (at kneading, with plasticizer) | 0.92 | 0.85 | 0.89 | 0.90 | 0.95 | 0.95 | 0.76 | 0.80 | 0.93 |
| ($\phi d/\phi m$) × ($\eta m/\eta d$) | (shaped article, no plasticizer) | 5.61 | 5.98 | 2.20 | 5.50 | 5.76 | 5.76 | 4.63 | 4.87 | 3.66 |
| Air permeability × $10^{-12}$ ($cm^3 \cdot cm/cm^2 \cdot sec \cdot cmHg$) | | 8 | 6 | 12 | 8 | 9 | 8 | 7 | 7 | 9 |
| M50(−20° C.) (MPa) | | 19 | 22 | 17 | 21 | 24 | 23 | 22 | 21 | 19 |
| Dynamic fatigue (−20° C.) | | Good | Good | Good | Good | Good | Good | Good | Good | Good |

| Formulation (parts by weight) | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Elastomer | IPMS*[1] | 100 | 100 | 100 | 90 | 80 | 70 | 70 |
| | Mah-EPM*[2] | — | — | — | 10 | — | — | — |
| | Br-IIR*[3] | — | — | — | — | 20 | — | — |
| | IIR*[4] | — | — | — | — | — | 30 | — |
| | PIB*[5] | — | — | — | — | — | — | 30 |
| Cross-linking agent | ZnO*[6] | 1.0 | 1.0 | 1.0 | 1.0 | 1.0 | 1.0 | 1.0 |
| | Stearic acid*[7] | 0.5 | 0.5 | 0.5 | 0.5 | 0.5 | 0.5 | 0.5 |
| Resin | Nylon 6.66*[8] | 250 | — | — | 260 | 320 | 320 | 200 |
| | Nylon 6*[9] | — | 250 | — | — | — | — | — |
| | Nylon 11*[10] | — | — | 110 | — | — | — | — |
| (Total) | | (351.5) | (351.5) | (211.5) | (361.5) | (421.5) | (421.5) | (301.5) |
| ($\phi d/(\phi m + \phi l)$) × ($\eta ml/\eta d$) | (at kneading) | 0.26 | 0.23 | 0.50 | 0.26 | 0.25 | 0.25 | 0.26 |
| ($\phi d/\phi m$) × ($\eta m/\eta d$) | (Shaped article) | 0.98 | 0.98 | 0.97 | 0.98 | 0.94 | 0.94 | 0.98 |
| Air permeability × $10^{-12}$ ($cm^3 \cdot cm/cm^2 \cdot sec \cdot cmHg$) | | 4 | 2 | 10 | 4 | 5 | 3 | 4 |
| M50 (−20° C.) (MPa) | | 48 | 51 | 25 | 46 | 46 | 50 | 41 |
| Dynamic fatigue (−20° C.) | | Poor | Poor | Poor | Poor | Poor | Poor | Poor |

Notes of Table I
*[1]IPMS (Exxon89-4) (viscosity: 200 Pa · s) made by Exxon Mobile Chemicals
*[2]Mah-EPM (Tufmar MP0620) (viscosity: 120 Pa · s) made by Mitsui Chemicals
*[3]Br-IIR (Bromobutyl X2) (viscosity: 20 Pa · s) made by Bayer
*[4]IIR (Exxon Butyl 268) (viscosity: 80 Pa · s) made by Exxon Mobile Chemicals
*[5]PIB (Oppanol B100) (viscosity: 300 Pa · s) made by BASF
*[6]Zinc white (Zinc No. 3) made by Seido Chemical Industries
*[7]Stearic acid (Beads Stearic Acid) made by NOF Corporation
*[8]Nylon 6.66 (UbeNylon 5033B) (viscosity: 500 Pa · s) made by Ube Industries
*[9]Nylon 6 (UbeNylon 1030B) (viscosity: 500 Pa · s) made by Ube Industries
*[10]Nylon 11 (Rilsan BESNOTL) (viscosity: 200 Pa · s) made by ARKEMA Viscosity of Plasticizer-Containing Nylon
Plasticizer-containing Nylon 11: 150 Pa·s
Plasticizer-containing Nylon 6: 170 Pa·s
Plasticizer-containing Nylon 6,66: 200 Pa·s Comparative Examples 8 to 13

Each elastomer and the cross-linking agent were mixed by an internal-type Banbury mixer (made by Kobe Steel Corporation) at 100° C. for 2 minutes to prepare a compound, which was then pelletized by a rubber pelletizer (made by Moriyama Seisakusho). Pellets of the compound and the pellets of the resin were kneaded by a twin screw kneader (made by Japan Steel Works). A part thereof was inverted in phase and could not be kneaded due to the fact that the rubber ratio is too high. The pellets prepared were formed into sheets by a T-die molding machine to obtain sheets of a thermoplastic elastomer composition. The sheets obtained were determined for physical properties as explained above. The results are shown in Table II.

TABLE II

| Formulation (parts by weight) | | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|
| Elastomer | IPMS*[1] | 100 | 100 | 100 | 100 | 100 | 100 |
| Cross-linking agent | ZnO*[1] | 1.0 | 1.0 | 1.0 | 1.0 | 1.0 | 1.0 |
| | Stearic acid*[1] | 0.5 | 0.5 | 0.5 | 0.5 | 0.5 | 0.5 |
| Resin | Nylon 6.66*[1] | 250 | — | — | 60 | — | — |
| | Nylon 6*[1] | — | 250 | — | — | 60 | — |
| | Nylon 11*[1] | — | — | 110 | — | — | 60 |
| (Total) | | 351.5 | 351.5 | 211.5 | 161.5 | 161.5 | 161.5 |
| ($\phi d/\phi m$) × ($\eta m/\eta d$) | (shaped article, no liquid) | 0.98 | 0.98 | 0.97 | 4.10 | 4.10 | 1.78 |
| State | | — | — | — | Phase inversion, poor | Phase inversion, poor | Phase inversion, poor |

TABLE II-continued

| Formulation (parts by weight) | Comp. Ex. 8 | Comp. Ex. 9 | Comp. Ex. 10 | Comp. Ex. 11 | Comp. Ex. 12 | Comp. Ex. 13 |
|---|---|---|---|---|---|---|
| Air permeability × $10^{-12}$ ($cm^3 \cdot cm/cm^2 \cdot sec \cdot cmHg$) | 4 | 2 | 11 | Not measurable | Not measurable | Not measurable |
| M50(−20° C.) (MPa) | 50 | 51 | 28 | Not measurable | Not measurable | Not measurable |
| Dynamic fatigue (−20° C.) | Poor | Poor | Poor | Not measurable | Not measurable | Not measurable |

*[1] See the notes of Table I

Comparative Examples 14 to 16

Each elastomer and cross-linking agent were mixed by an internal-type Banbury mixer (made by Kobe Steel Corporation) at 100° C. for 2 minutes to prepare a compound, which was then pelletized by a rubber pelletizer (made by Moriyama Seisakusho). Into the resin pellets, a plasticizer for resin (butyl benzene sulfonamide BM-4 made by Daihachi Chemical Industry Co., Ltd.) was added in an amount of about 30% by weight based upon the weight of the resin and kneaded by a twin-screw kneader (made by Japan Steel Works), then the plasticizer-containing resin obtained and the rubber pellets were kneaded again by a twin-screw kneader (made by Japan Steel Works) to prepare pellets of a plasticizer-containing elastomer composition. The pellets prepared were formed into sheets by a T-die molding machine to obtain sheets of a thermoplastic elastomer composition. The sheets obtained were measured for physical properties as explained above. The results are shown in Table III.

TABLE III

| Formulation (parts by weight) | | Comp. Ex. 14 | Comp. Ex. 15 | Comp. Ex. 16 |
|---|---|---|---|---|
| Elastomer | IPMS*[1] | 100 | 100 | 100 |
| Cross-linking agent | ZnO*[1] | 1.0 | 1.0 | 1.0 |
| | Stearic acid*[1] | 0.5 | 0.5 | 0.5 |
| Resin | Nylon 6.66*[1] | 56 | — | — |
| | Nylon 6*[1] | — | 53 | — |
| | Nylon 11*[1] | — | — | 53 |
| Plasticizer*[2] | | 24 | 22 | 22 |
| (Total) | | 181.5 | 176.5 | 176.5 |
| ($\phi d/(\phi m + \phi l)) \times (\eta ml/\eta d)$ | (at kneading and shaped article, with plasticizer) | 0.92 | 0.85 | 0.89 |
| Air permeability × $10^{-12}$ ($cm^3 \cdot cm/cm^2 \cdot sec \cdot cmHg$) | | 26 | 25 | 35 |
| M50(−20° C.) (MPa) | | 15 | 16 | 12 |
| Dynamic fatigue (−20° C.) | | Good | Good | Good |

*[1] See notes of Table I
*[2] Butylbenzene sulfonamide (BM-4 made by Daihachi Chemical Industry Co., Ltd.)

Tire Tests

The sheets obtained were used for the following tire tests. The results are shown in Table IV.

TABLE IV

| | Ex. 1 | Ex. 3 | Comp. Ex. 1 | Comp. Ex. 3 | Comp. Ex. 14 |
|---|---|---|---|---|---|
| Air leakage | Pass | Pass | Pass | Pass | Fail |
| −20° C. dynamic durability test | Pass | Pass | Fail | Fail | Pass |

Air leakage test: The material described in each Example (thickness 0.15 mm) was used as an inner liner to prepare a 195/65/R15 size tire. The change in internal pressure at an initial air pressure of 250 KPa and a 25° C. atmosphere was measured over three months. The tire was compared with a tire using a standard inner liner of butyl rubber/natural rubber 80/20% by weight. A tire with at least the same retention rate of internal pressure was judged as passing, while one with less was judged as failing.

−20° C. Dynamic durability test: The material described in each example (thickness 0.15 mm) was used for an inner liner to prepare a 195/65/R15 size tire. This was run under conditions of an air pressure of 120 KPa and a −20° C. atmosphere under a load of 4.8 kN on a metal drum for 30,000 km. Thereafter, the inner liner was observed. Samples where cracks occurred were judged as failing.

INDUSTRIAL APPLICABILITY

According to the present invention, it is possible to obtain a flexible elastic body, while maintaining the characteristics of the thermoplastic resins, and, therefore, for example, it is possible to prepare an inner liner having heat resistance, low gas permeability, chemical resistance and high dynamic durability and, due to similar properties, it is possible to use the same for other parts of pneumatic tires, hose inner tubes, packing, etc.

The invention claimed is:

1. A method for producing an elastomer composition (C) having no thermoplasticity which comprises a matrix of a thermoplastic resin (A) in which a dispersed phase of an elastomer component (B) is finely dispersed to form an island-in-sea structure, wherein volume ratios of the thermoplastic resin (A) and the elastomer component (3) satisfy the following formula (I):

$$\phi d/\phi m > \eta d/\eta m \quad (I)$$

where $\phi d$ and $\eta d$, respectively, indicate a volume ratio and a melt viscosity of the elastomer component (B) and $\phi m$ and $\eta m$, respectively, indicate a volume ratio and a melt viscosity of the thermoplastic resin (A), said method comprising:

mixing and shaping a thermoplastic resin (A), an elastomer component (B) and a plasticizer (D) in a ratio satisfying the following formulae (II) and (III):

$$\phi d/(\phi m+\phi 1)\times(\eta n/\eta d)<1 \quad (II)$$

$$\eta ml/\eta d=0.8\text{-}1.2 \quad (III)$$

wherein $\phi d$ and $\eta d$, respectively, indicate a volume ratio and a viscosity of the elastomer component (B), $\phi m$ indicates a volume ratio of the thermoplastic resin (A), $\phi 1$ indicates a volume ratio of the plasticizer (D) and $\eta ml$ indicates a melt viscosity of a mixture of the thermoplastic resin (A) and the plasticizer (D); and, then, removing the plasticizer (D) by evaporation, extraction or migration.

2. A method for producing an elastomer composition (C) according to claim 1, wherein the plasticizer (D) is alkylbenzene sulfonamide.

3. A method as claimed in claim 1, wherein the thermoplastic resin (A) is at least one thermoplastic resin selected from the group consisting of Nylon 6, Nylon 6/66 copolymer, Nylon 11, Nylon 12, a Nylon 6/10 copolymer and a Nylon 6/12 copolymer.

4. A method as claimed in claim 1, wherein the elastomer component (B) is at least one elastomer selected from the group consisting of a bromide of an isoprene-paramethyl styrene copolymer, a maleic anhydride-modified ethylene-α-olefin copolymer, butyl rubber, halogenated butyl rubber and polyisoprene rubber.

* * * * *